(12) United States Patent
Hsu

(10) Patent No.: US 8,424,657 B2
(45) Date of Patent: Apr. 23, 2013

(54) CYLINDER ASSEMBLY

(76) Inventor: Jung Yu Hsu, Tainan (TW)

( * ) Notice: Subject to any disclaimer, the term of this patent is extended or adjusted under 35 U.S.C. 154(b) by 218 days.

(21) Appl. No.: 12/978,746

(22) Filed: Dec. 27, 2010

(65) Prior Publication Data

US 2012/0160623 A1    Jun. 28, 2012

(51) Int. Cl.
*F16F 9/36*    (2006.01)

(52) U.S. Cl.
USPC ............ 188/322.16; 188/322.17; 188/322.18; 267/124

(58) Field of Classification Search .............. 267/64.13, 267/294, 286, 64.16, 64.17, 64.15, 124; 180/322.16, 180/322.18, 322.22, 322.15, 300
See application file for complete search history.

(56) References Cited

U.S. PATENT DOCUMENTS

| | | | | |
|---|---|---|---|---|
| 3,625,540 A | * | 12/1971 | Jewell | 267/64.16 |
| 3,963,101 A | * | 6/1976 | Stadelmann et al. | 188/300 |
| 4,544,144 A | * | 10/1985 | Ishida et al. | 267/64.15 |
| 4,709,790 A | * | 12/1987 | Freitag et al. | 188/300 |
| 5,848,677 A | * | 12/1998 | Beck et al. | 188/322.22 |

* cited by examiner

*Primary Examiner* — Melanie Torres Williams
(74) *Attorney, Agent, or Firm* — Rosenberg, Klein & Lee

(57) ABSTRACT

A cylinder assembly includes a piston rod connected to a piston which is movably received in a cylinder and the interior of the cylinder is defined into a first room and a second room by the piston. A first groove and a second groove are respectively defined in the inside and the outside of the piston, and the two grooves are longitudinally aligned with each other. Two seal rings are respectively engaged with the first and second grooves. The first groove includes a first inner surface and the second groove includes a second inner surface. A distance is defined between two respective extension lines of the first and second grooves. Each of the two respective extension lines is defined by extending a line from the first/second inner surface of the first/second groove. The outer diameter of the piston is reduced for being used with a smaller cylinder.

7 Claims, 8 Drawing Sheets

CYLINDER ASSEMBLY

FIELD OF THE INVENTION

The present invention relates to a cylinder assembly, and more particularly, to a piston assembly with a piston which has smaller outer diameter and better structural strength.

BACKGROUND OF THE INVENTION

A conventional cylinder generally includes a cylinder with a piston movably received therein and the outer diameter of the piston is substantially the same as the inner diameter of the cylinder so that the interior of the cylinder is divided into two rooms by the piston. The movable piston changes the room so as to transfer the pressure that the pressurized air or hydraulic liquid pushed by the piston. The piston decides the transfer of the force of the cylinder.

The cylinder usually is a hollow and cylindrical body and the piston includes piston rings mounted thereon which are in contact with the inside of the cylinder so that when the piston moves, the volume of the rooms in the cylinder changes.

Taiwan Patent Application No. 092204057 discloses a bicycle shock absorbing device which includes an outer tube with a closed end and an open end in which a cylinder is inserted. The cylinder has an open end inserted into the outer tube and fixed with a fixed member, and the other end of the cylinder extends out from the outer tube and is sealed. A piston rod extends through the closed end of the outer tube and is connected with a piston which is located in the cylinder. The piston includes a valve hole for receiving a valve therein. The piston defines the interior of the cylinder into the first room and the second room, the first room is located close to the closed end of the outer tube and a movable member is located between the fixed member and the piston. There is a gap defined between the movable member and the fixed member.

Taiwan Patent Application No. 099209955 discloses a bicycle shock absorbing device discloses an outer tube with an inner tube received therein, and a top cap and a bottom cap respectively seal the two ends of the outer tube. A room is defined between the inner tube and the outer tube, the inner tube communicates with the room. The room includes a piston received therein which is movably in contact with the outside of the inner tube and the inside of the outer tube. Hydraulic liquid flows between the inner tube and the room and sealed by the movable piston. Air is filled in the room and sealed by the movable piston so that the piston is balance between the pressures of the air and the hydraulic liquid.

For Taiwan Patent Application No. 092204057, the movable member is connected with the piston rod and the first room and the gap are defined by the movable member, the piston and the fixed member. For Taiwan Patent Application No. 099209955, the movable piston is movably in contact with the outside of the inner tube and the inside of the outer tube, and the movable member in the room defines two respective rooms for receiving hydraulic liquid and air.

However, no matter the cylinder is connected with a piston rod or between two tubes, the piston rings are located on the outside of the piston so that the outside of the piston are applied by linear forces when the piston moves. This makes the piston to be tilt and gaps are defined between the cylinder and the piston to affect the sealed status. Therefore, the hydraulic liquid and/or air in one room may flow into the other room to affect the movement of the piston. Besides, the outer diameter of the piston restricts the size of the cylinder so that when a smaller cylinder is required, the size piston has to be reduced and which is difficult.

The present invention intends to provide a cylinder assembly which improves the shortcomings of the conventional cylinders.

SUMMARY OF THE INVENTION

The present invention relates to a cylinder assembly and comprises a piston rod having an end inserted into a cylinder and an end piece is connected to the end of the piston rod. A piston is a hollow and cylindrical member and mounted to the piston rod. The inside of the piston contacts the outside of the piston rod and the outside of the piston contacts the inside of the cylinder. The interior of the cylinder is defined into a first room and a second room by the piston. At least one first groove is defined in the inside of the piston and at least one second groove is defined in the outside of the piston. The at least one first groove is located longitudinally aligned with the at least one second groove. Each of the at least one first groove and the at least one second groove has a seal ring received therein. A distance is defined between two respective extension lines of the at least one first groove and the at least one second groove. Each of the two respective extension lines is defined by extending a line from the first/second inner surface of the at least one first/second groove.

The primary object of the present invention is to provide a piston for a cylinder wherein the piston includes multiple grooves in both inside and outside thereof and each groove has a seal ring engaged therewith. The grooves are located alternatively so as to bear linear forces applied to the piston and the piston does not tilt during operation. The hydraulic liquid and air in different rooms in the cylinder do not leak.

Another object of the present invention is to provide a piston for a cylinder wherein there is a distance defined between the two respective inner surfaces of the grooves in the inside and outside of the piston. The distance is larger than zero so as to reduce the outer diameter and weight of the piston.

Yet another object of the present invention is to provide a piston for a cylinder wherein each groove includes a washer located between the inside wall and the seal ring and the hardness of the seal ring, the washer and the inside wall of the groove are different to protect the seal rings from being overly deformed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
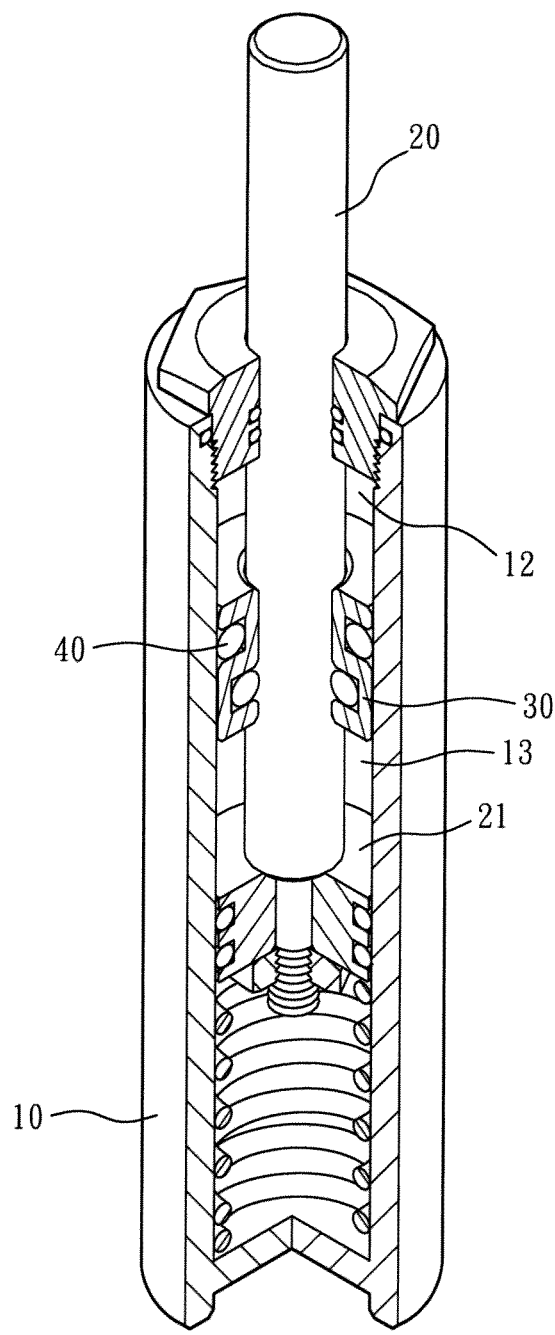
FIG. 1 shows the cylinder assembly, partly removed, of the present invention.
Figure 2:
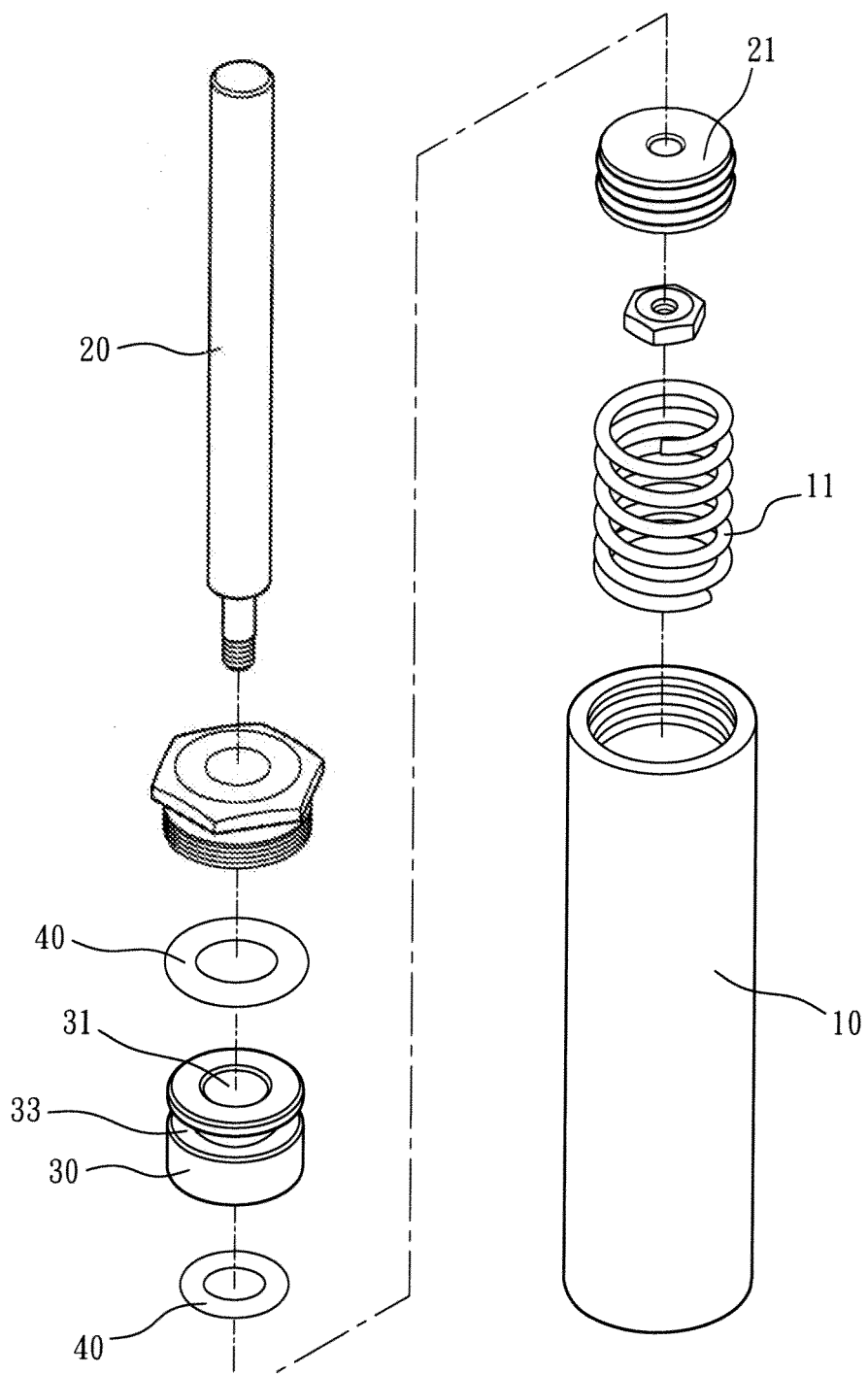
FIG. 2 is an exploded view to show the cylinder assembly of the present invention.
Figure 3:
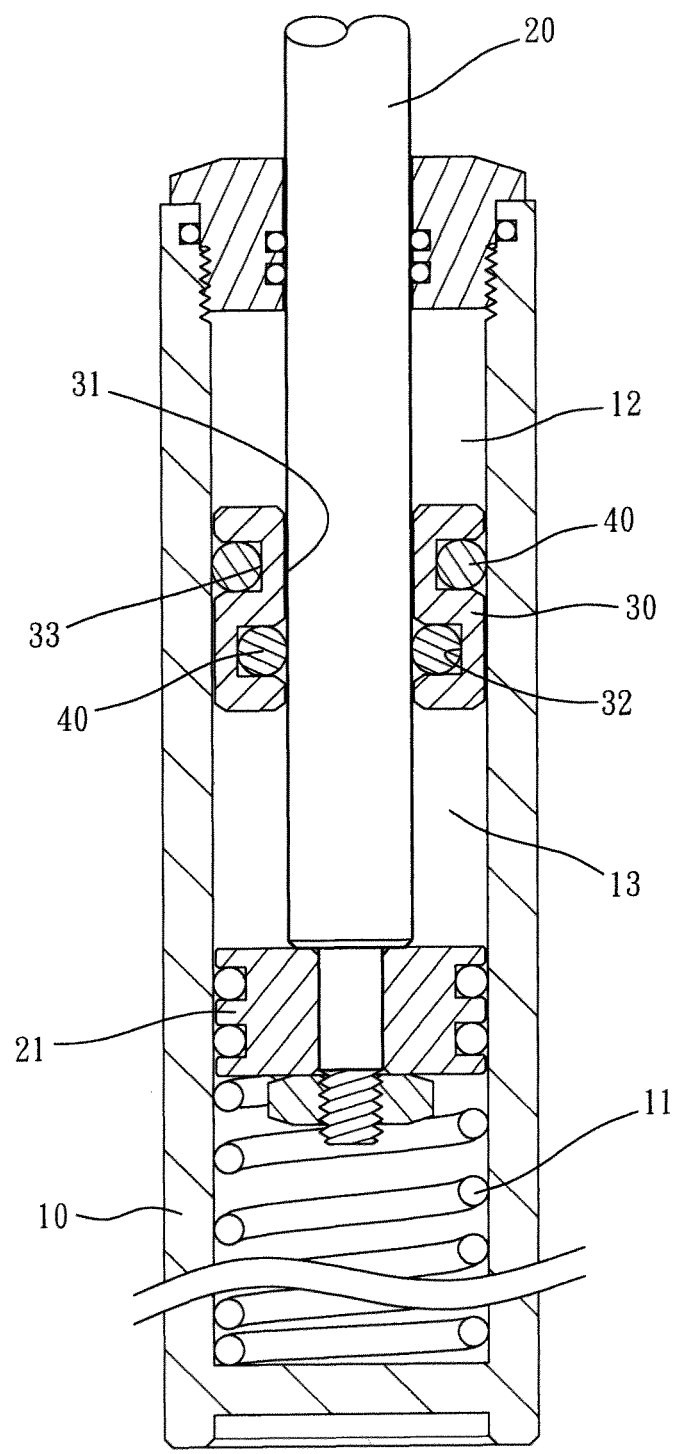
FIG. 3 is a cross sectional view of the cylinder assembly of the present invention.
Figure 4:
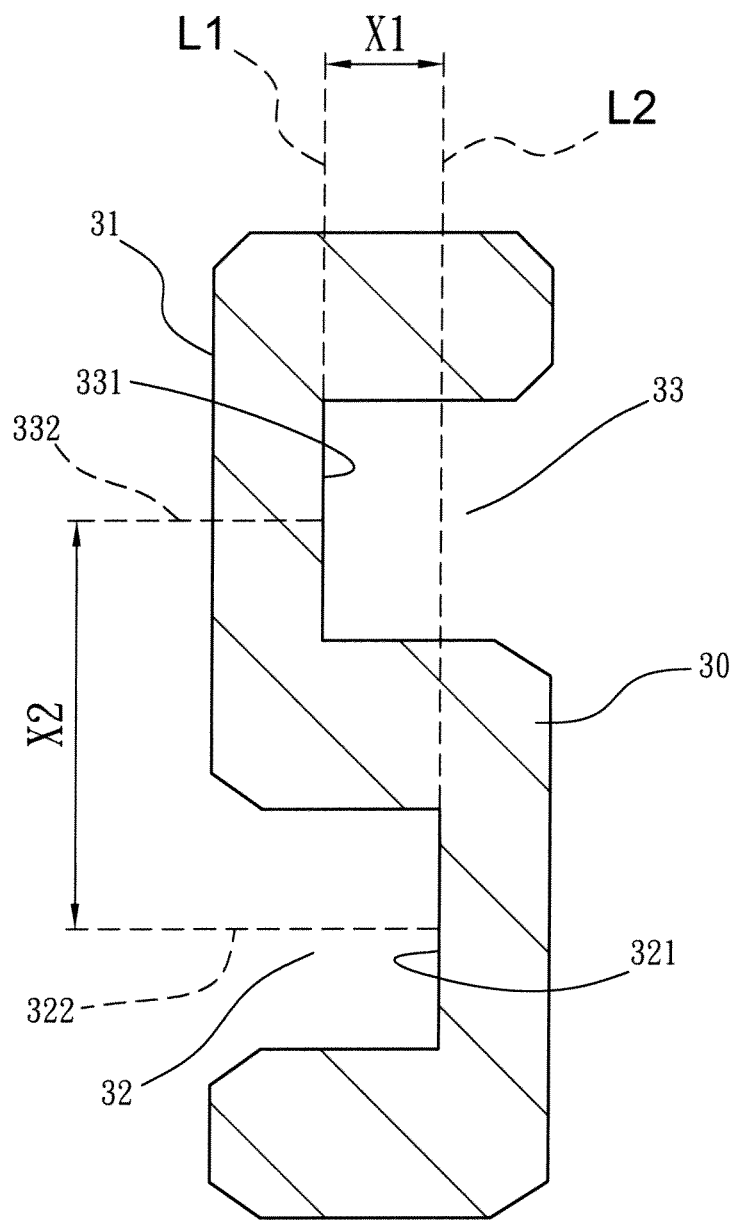
FIG. 4 shows a cross sectional view of a part of the piton of the present invention.

Referring to FIGS. 1 to 4, the cylinder assembly of the present invention comprises a cylinder 10, a piston rod 20, and a piston 30.

The cylinder 10 has a buffering member 11 received therein.

The piston rod 20 has an end inserted into a cylinder 10 and an end piece 21 is connected to the end of the piston rod 20. The end piece 21 is in contact with the buffering member 11.

The piston 30 is a hollow and cylindrical member and has a passage 31 so that the piston rod 20 extends through the passage 31. The piston 30 is movably received in the cylinder 10. The inside of the piston 30 contacts an outside of the piston rod 20 and the outside of the piston 20 contacts the inside of the cylinder 20. The interior of the cylinder 10 is defined into a first room 12 and a second room 13 by the piston 30. The first and second rooms 12, 13 can receive air, hydraulic liquid or resilient member. The first and second rooms 12, 13 can also receive combination of the air and the hydraulic liquid. The first and second rooms 12, 13 can also receive air or combination of hydraulic liquid and resilient member. At least one first groove 32 is defined in the inside of the piston 30 and at least one second groove 33 is defined in the outside of the piston 30. In this embodiment, the number of the at least one first and second grooves is one. The first groove 32 is located longitudinally aligned with the second groove 33 and in opposite directions. Each of the first and second grooves 32, 33 has a seal ring 40 received therein. The first groove 32 includes a first inner surface 321, and the second groove 33 includes a second inner surface 331. A first distance "X1" is defined between two respective extension lines of the first groove 32 and the second groove 33, wherein each of the two respective extension lines is defined by extending a line from the first/second inner surface 321/331 of the at least one first/second groove 32/33. The first and second inner surfaces 321, 331 are parallel with the passage 31, and the first and second inner surfaces 321, 331 are parallel to each other. The first distance L1 is larger than 0. A third extension line 322 extends perpendicularly from a middle point of the first inner surface 321 and a fourth extension line 332 extends perpendicularly from a middle point of the second inner surface 331. A second distance "L2" is defined between the third and fourth extension lines 322, 332. The seal rings 40 are a circular ring.

The first and second grooves 32, 33 are defined in opposite sides of the piston 30 and each of the first and second grooves 32, 33 has a seal ring 40 received therein. The grooves 32, 33 are located alternatively so as to bear linear forces applied to the piston 30 so that the piston 30 does not tilt during operation. The hydraulic liquid and air in different rooms 12, 13 in the cylinder 10 do not leak. The first distance "L1" is defined between the two respective inner surfaces 321, 331 of the first and second grooves 32, 33 in the piston 30. The first distance "L1" is larger than zero so as to reduce the outer diameter and weight of the piston 30 so as to be cooperated with a smaller cylinder 10.

Figure 5:
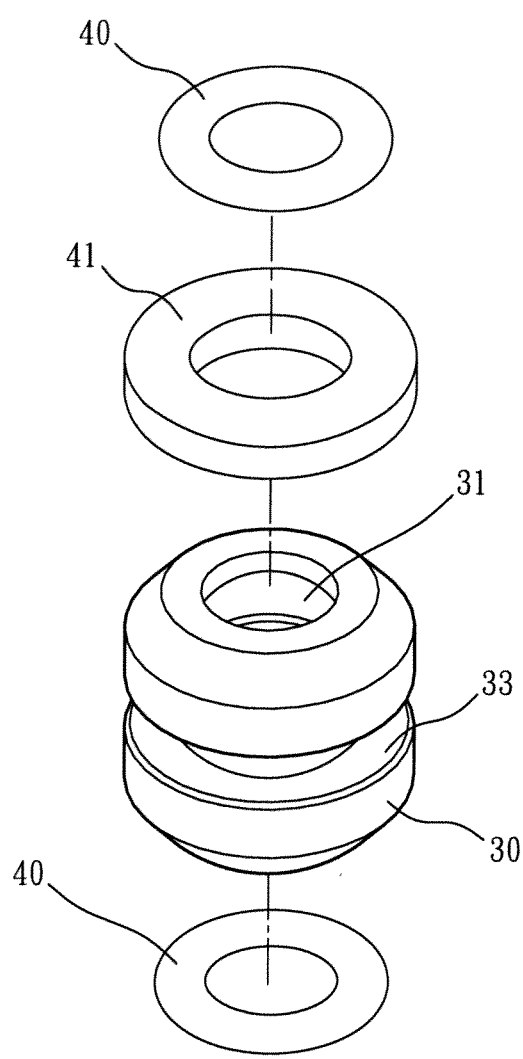
FIG. 5 is an exploded view to show another embodiment of the piston of the cylinder assembly of the present invention.
Figure 6:
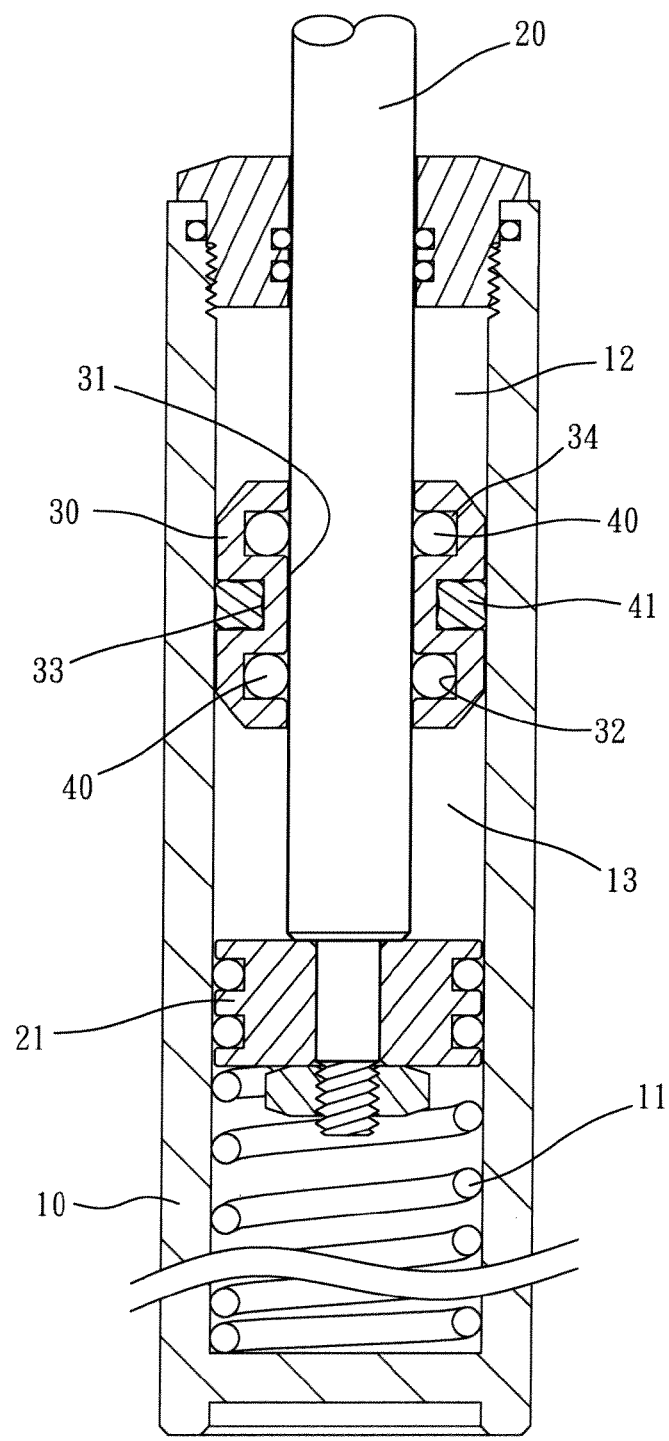
FIG. 6 is a cross sectional view of the cylinder assembly of FIG. 5 of the present invention.

FIGS. 5 and 6 show another embodiment of the piston 30 of the cylinder assembly of the present invention, wherein the piston 30 is made longer to have a third groove 34 in the inside of the piston 30 and located next to the second groove 33. A seal ring 40 is received in the third groove 34. The seals 40 in the first and third grooves 32, 34 are circular rings and the seal ring 41 in the second groove 33 is a rectangular ring (cross section) 41.

Figure 7:
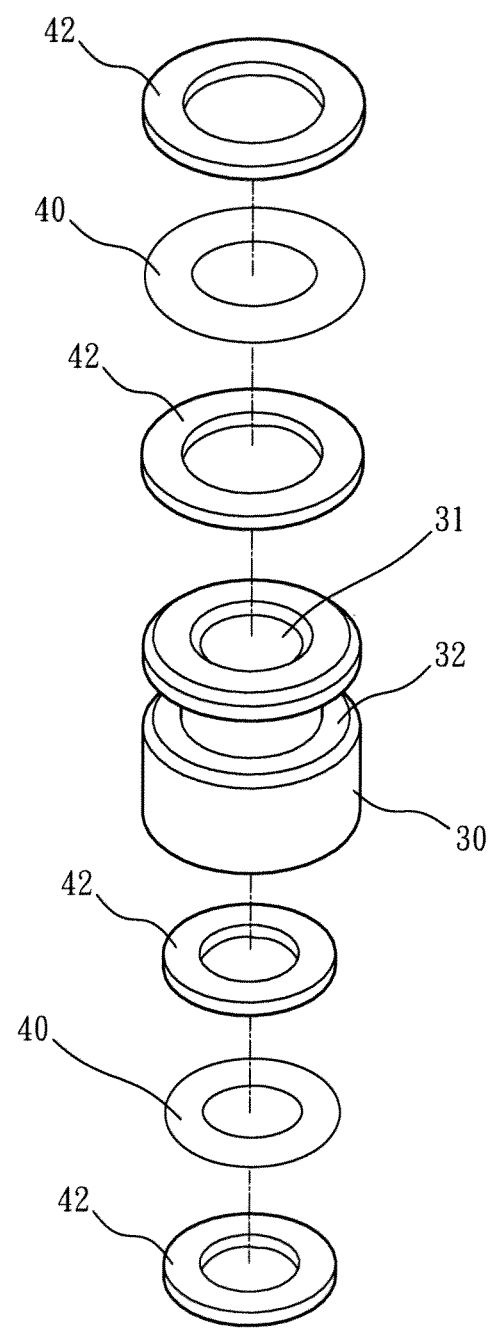
FIG. 7 is an exploded view to show yet another embodiment of the piston of the cylinder assembly of the present invention.
Figure 8:
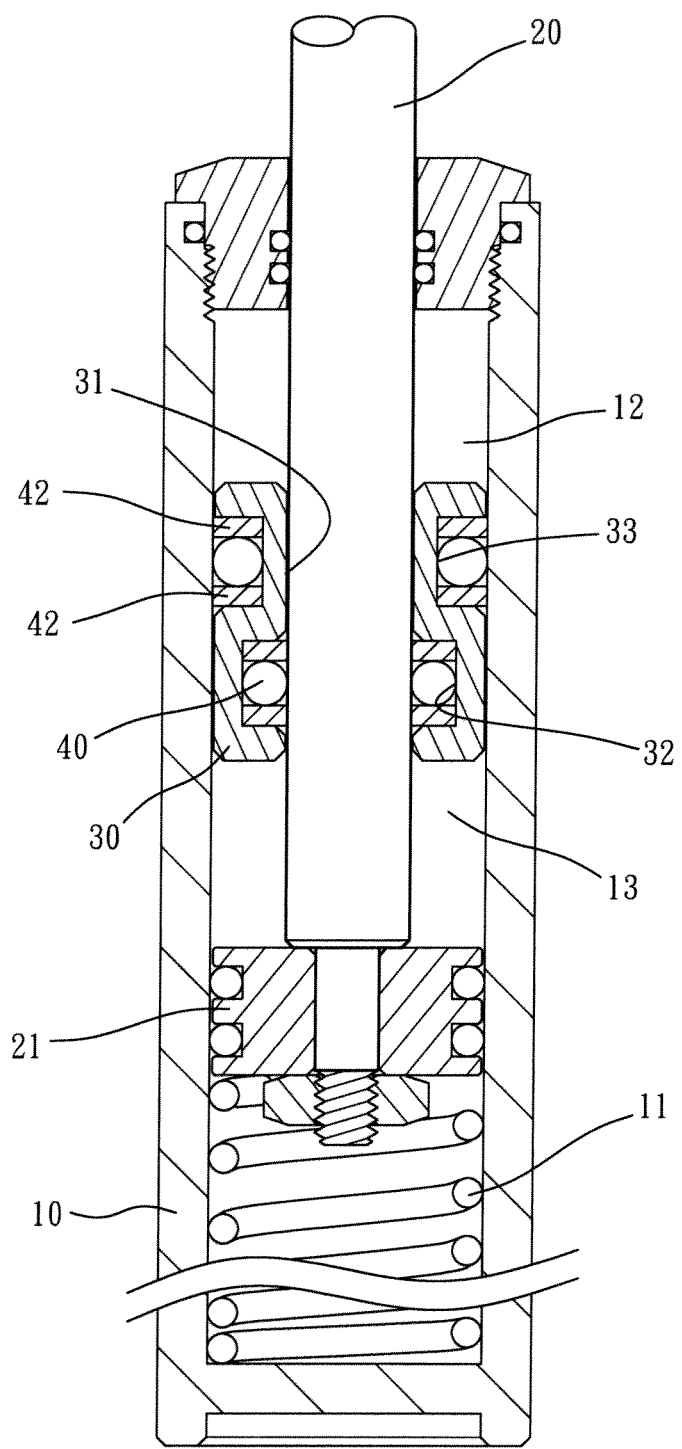
FIG. 8 is a cross sectional view of the cylinder assembly of FIG. 7 of the present invention.

FIGS. 7 and 8 show yet another embodiment of the piston 30 of the cylinder assembly of the present invention, wherein each of the seal rings 40 is located between two washers 42 in each of the first and second grooves 32, 33. The hardness of each of the two washers 42 is less harder than that of the seal rings 40 and the hardness the seal rings 40 is less harder than that the piston 30. Alternatively, the hardness of each of the two washers 42 is harder than that the seal rings 40 and the hardness of the washers 42 is less harder than that of the piston 30. By the different hardness of the different seal rings 40, the washers 42 and the cylinders 10, the seal rings 40 are protected from overly deformed.

While we have shown and described the embodiment in accordance with the present invention, it should be clear to those skilled in the art that further embodiments may be made without departing from the scope of the present invention.

What is claimed is:

1. A cylinder assembly comprising:
a piston rod having an end inserted into a cylinder and an end piece connected to the end of the piston rod;
a piston being a hollow and cylindrical member and mounted to the piston rod, the piston movably received in the cylinder, an inside of the piston contacting an outside of the piston rod and an outside of the piston contacting an inside of the cylinder, an interior of the cylinder being defined into a first room and a second room by the piston, at least one first groove defined in the inside of the piston and at least one second groove defined in the outside of the piston, the at least one first groove being located longitudinally aligned with the at least one second groove, each of the at least one first groove and the at least one second groove having a seal ring received therein, the at least one first groove including a first inner surface, the at least one second groove including a second inner surface, a first distance defined between two respective extension lines of the at least one first groove and the at least one second groove, each of the two respective extension lines being defined by extending a line from the first/second inner surface of the at least one first/second groove;
wherein the piston has a passage and communicates with the at least one first groove, the piston rod extends through the passage, the first and second inner surfaces are parallel with the passage, the first and second inner surfaces are parallel to each other and located alternatively to each other.

2. The cylinder assembly as claimed in claim 1, wherein the first distance is larger than zero.

3. The cylinder assembly as claimed in claim 1, wherein a third extension line extends perpendicularly from a middle point of the first inner surface and a fourth extension line extends perpendicularly from a middle point of the second inner surface, a second distance is defined between the third and fourth extension lines.

4. The cylinder assembly as claimed in claim 1, wherein the seal rings are a circular ring.

5. A cylinder assembly, cylinder assembly comprising:
a piston rod having an end inserted into a cylinder and an end piece connected to the end of the piston rod;
a piston being a hollow and cylindrical member and mounted to the piston rod, the piston movably received in the cylinder, an inside of the piston contacting an outside of the piston rod and an outside of the piston contacting an inside of the cylinder, an interior of the cylinder being defined into a first room and a second room by the piston, at least one first groove defined in the inside of the piston and at least one second groove defined in the outside of the piston, the at least one first groove being located longitudinally aligned with the at least one second groove, each of the at least one first groove and the at least one second groove having a seal ring received therein, the at least one first groove including a first inner surface, the at least one second groove including a second inner surface, a first distance defined between two respective extension lines of the at least one first groove and the at least one second groove, each of the two respective extension lines being defined by extending a line from the first/second inner surface of the at least one first/second groove;

wherein each of the seal rings is located between two washers in each of the at least one first and second grooves.

6. The cylinder assembly as claimed in claim 5, wherein a hardness of each of the two washers is less harder than that of the seal rings and the hardness the seal rings is less harder than that the piston.

7. The cylinder assembly as claimed in claim 5, wherein a hardness of each of the two washers is harder than that the seal rings and the hardness of the washers is less harder than that of the piston.

* * * * *